US00RE39327E

(19) United States
(12) Reissued Patent
Reasoner

(10) Patent Number: US RE39,327 E
(45) Date of Reissued Patent: Oct. 10, 2006

(54) CONDUIT SHORTENING ADJUSTMENT ASSEMBLY

(75) Inventor: Michael Reasoner, Grand Blanc, MI (US)

(73) Assignee: Teleflex Incorporated, Limerick, PA (US)

(21) Appl. No.: 09/115,764

(22) Filed: Jul. 15, 1998

Related U.S. Patent Documents

Reissue of:
(64) Patent No.: 5,653,148
Issued: Aug. 5, 1997
Appl. No.: 08/573,561
Filed: Dec. 15, 1995

(51) Int. Cl.
*F16C 1/10* (2006.01)

(52) U.S. Cl. ..... 74/502.4; 74/500.5; 74/501.5 R; 74/502; 74/502.6; 403/DIG. 7; 403/327

(58) Field of Classification Search ..... 74/500.5, 74/501.5 R, 502, 502.4, 502.6; 403/DIG. 7, 403/327, 300, 294
See application file for complete search history.

(56) References Cited

U.S. PATENT DOCUMENTS

| | | | | | |
|---|---|---|---|---|---|
| 2,848,216 | A | * | 8/1958 | McGurk | 267/1 |
| 3,572,159 | A | | 3/1971 | Tschanz | |
| 3,593,594 | A | * | 7/1971 | Perry | 74/501.5 R |
| 3,981,207 | A | * | 9/1976 | Stant et al. | 74/513 |
| 4,598,809 | A | | 7/1986 | Glover et al. | |
| 4,751,851 | A | * | 6/1988 | Deligny et al. | |
| 4,753,123 | A | | 6/1988 | Stormont | |
| 4,787,263 | A | * | 11/1988 | Jaksic | 74/501.5 R |
| 4,793,050 | A | * | 12/1988 | Niskanen | |
| 4,833,937 | A | * | 5/1989 | Nagano | |
| 4,892,004 | A | * | 1/1990 | Segura et al. | |
| 4,895,041 | A | * | 1/1990 | Cunningham | 74/502.6 |
| 4,917,224 | A | * | 4/1990 | Gokee | |
| 4,917,418 | A | * | 4/1990 | Gokee | |
| 4,930,932 | A | * | 6/1990 | LeVahn | 403/327 X |
| 4,936,161 | A | * | 6/1990 | Polando | |
| 5,039,138 | A | * | 8/1991 | Dickirson | 74/502.6 |
| 5,119,689 | A | * | 6/1992 | Adams et al. | |
| 5,138,897 | A | * | 8/1992 | Beard et al. | |
| 5,144,856 | A | * | 9/1992 | Roca | |
| 5,161,428 | A | | 11/1992 | Petruccello | |
| 5,167,166 | A | * | 12/1992 | Ruhlman | 74/502.4 |
| 5,178,034 | A | | 1/1993 | Reasoner | |
| 5,191,866 | A | * | 3/1993 | Tosdale | 123/400 |
| 5,222,411 | A | | 6/1993 | Hedstrom et al. | |
| 5,295,408 | A | * | 3/1994 | Nagle et al. | |
| 5,339,783 | A | * | 8/1994 | Teichert | 74/513 |
| 5,435,203 | A | * | 7/1995 | Spease et al. | 74/527 X |
| 5,509,750 | A | * | 4/1996 | Boike | 403/327 X |
| 5,575,180 | A | * | 11/1996 | Simon | 74/502.4 |
| 5,577,415 | A | * | 11/1996 | Reasoner | 74/502.4 |

FOREIGN PATENT DOCUMENTS

| | | | | |
|---|---|---|---|---|
| DE | 19603893 | * | 11/1996 | 74/502.4 |
| EP | 0312382 | | 4/1989 | |
| EP | 0517583 | * | 12/1992 | 74/501.5 R |
| GB | 8807826.4 | * | 9/1988 | 74/502.6 |
| WO | 9322571 | | 11/1993 | |

OTHER PUBLICATIONS

Commercial Activity Statement in Supplemental IDS signed and filed Jul. 13, 1999.

* cited by examiner

*Primary Examiner*—Vinh T. Luong
(74) *Attorney, Agent, or Firm*—Baker & Hostetler LLP

(57) ABSTRACT

An adjustment assembly in a motion transmitting remote control wherein the overall length of the conduit is adjusted to accommodate the installed post. Male (18) and female (20) telescoping members are biased into one another to shorten the overall length of the conduit. A spring (22) is retained in position on the male member (18) by a collar (26) until fully 11 inserted into the female member (20) whereupon the locking member (19) which interlocks the telescoping members presents an abutment to engage the collar (26) as the telescoping members (18 and 20) are telescoped into one another.

30 Claims, 5 Drawing Sheets

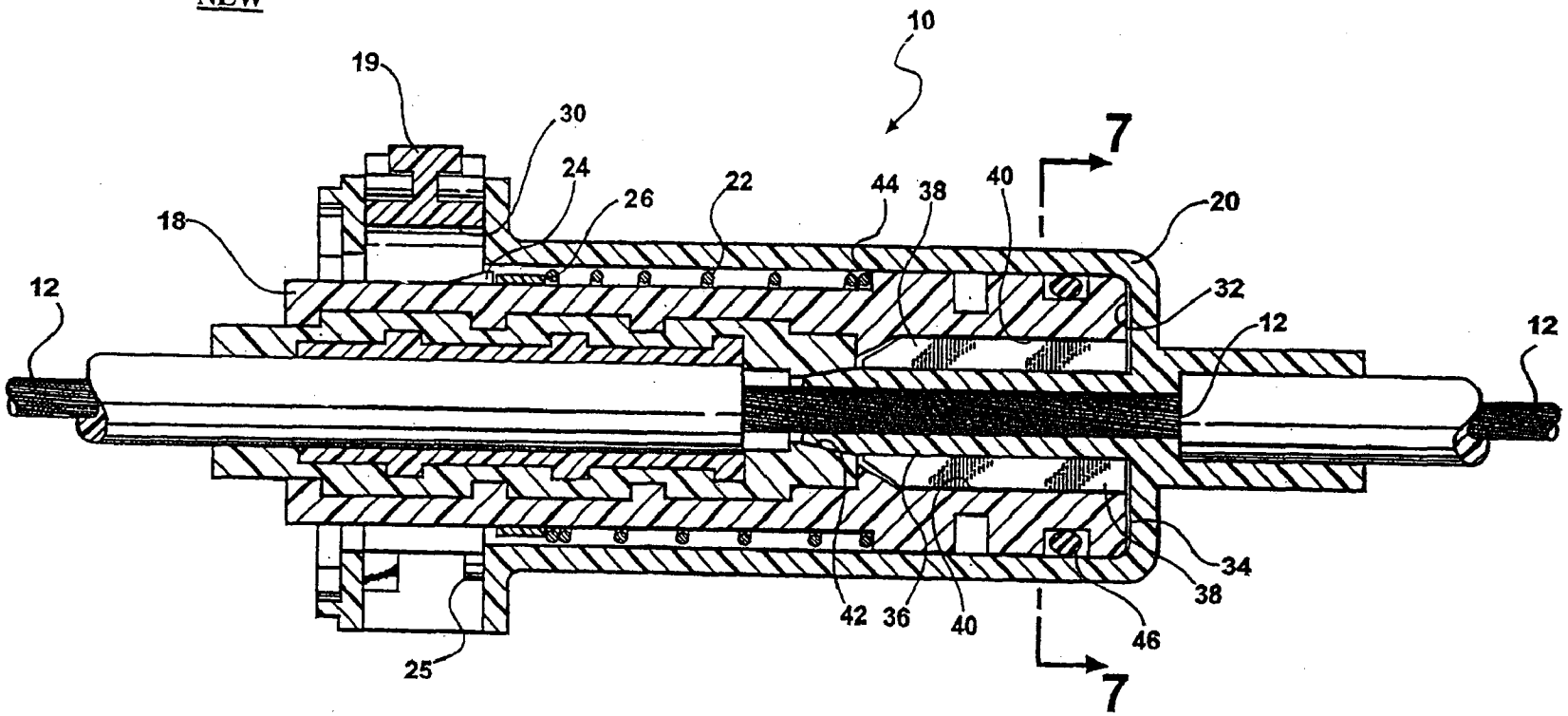
FIG - 3A
NEW

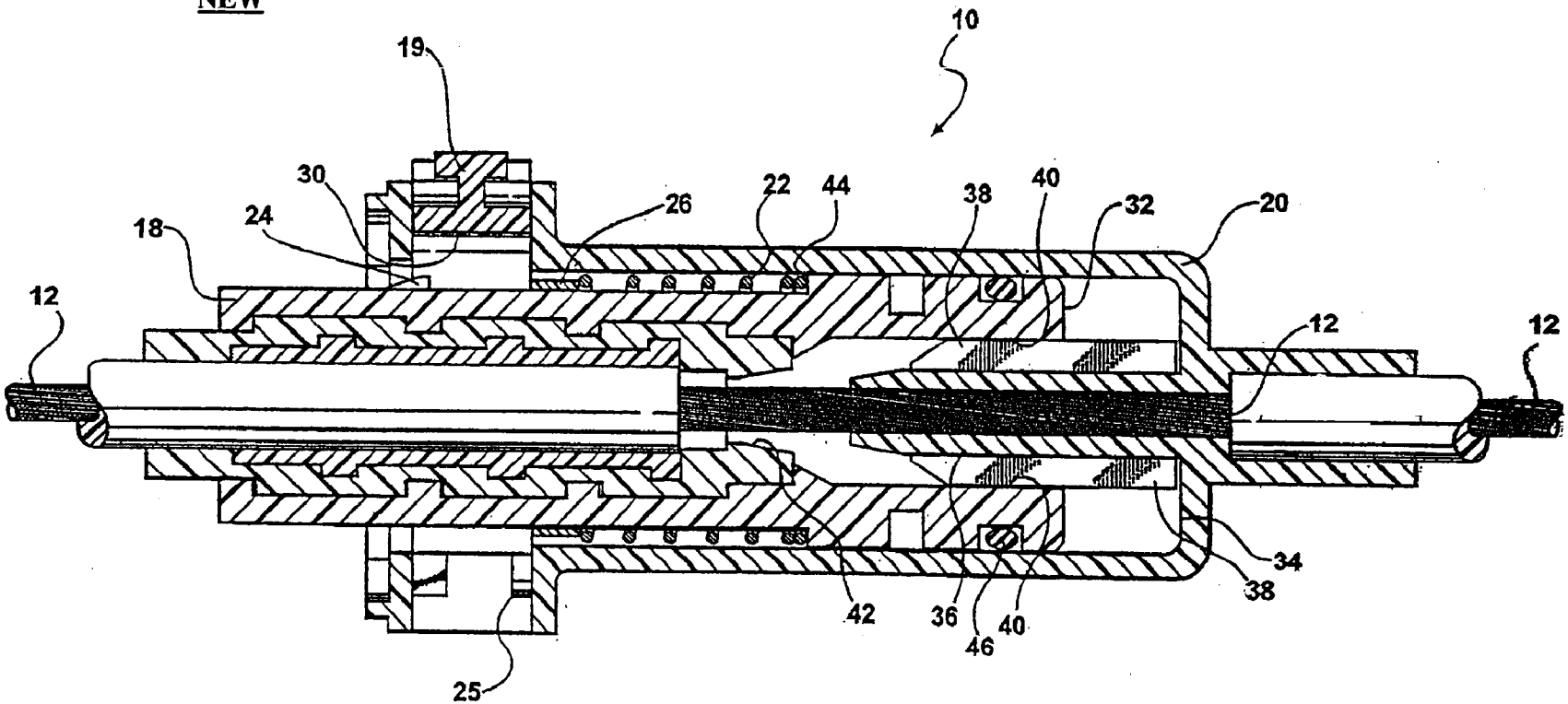
FIG - 3B
NEW

FIG-6
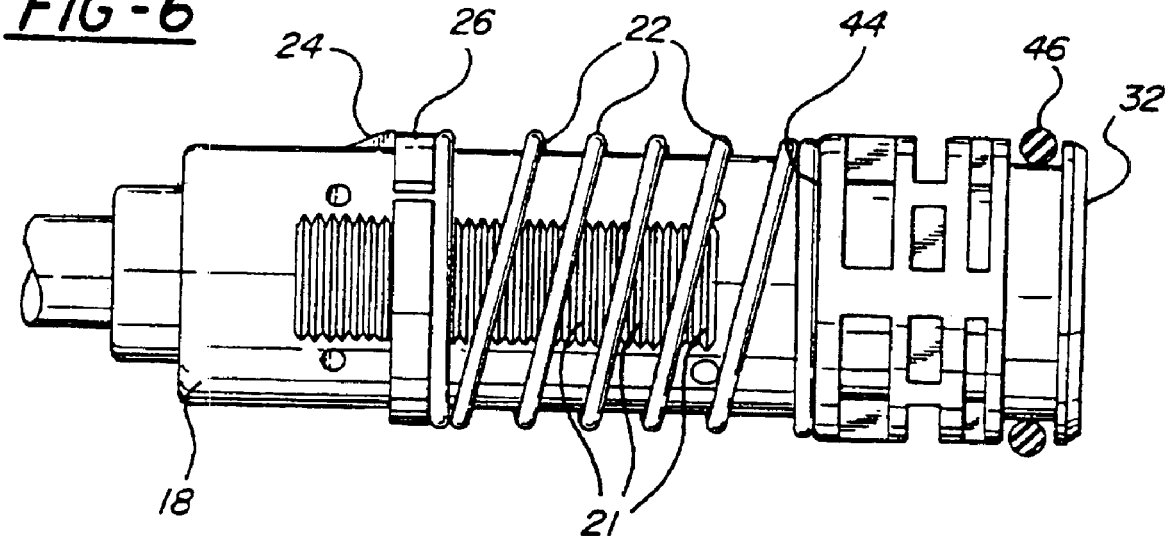
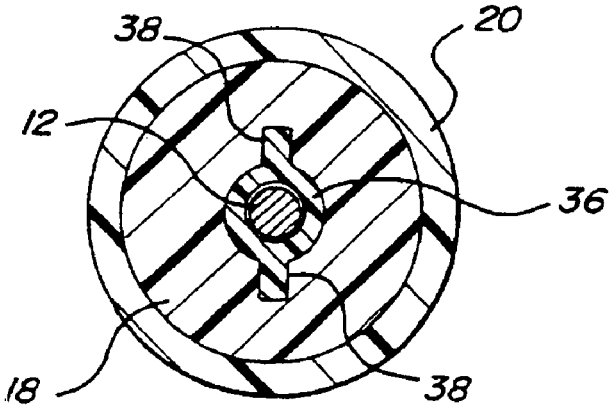
FIG-7

CONDUIT SHORTENING ADJUSTMENT ASSEMBLY

Matter enclosed in heavy brackets [ ] appears in the original patent but forms no part of this reissue specification; matter printed in italics indicates the additions made by reissue.

TECHNICAL FIELD

The subject invention relates to a motion transmitting remote control assembly of the type for transmitting motion in a curved path by a flexible motion transmitting core element movably supported in a conduit.

BACKGROUND OF THE INVENTION

Such remote control assemblies are used in automobiles to control heaters, vents, accelerators, throttles, parking-brake interlocks, etc. The length of the conduit must be adjustable during installation as the routing and distance between the connection points varies. A manually adjustable assembly is one wherein the length of the conduit changes as two telescoping members interconnect the ends of the conduit and move longitudinally relative to one another during installation to the adjusted position whereupon a locking member is moved to a locking position to interlock the two telescoping members to prevent any change in the length of the conduit. Examples of such assemblies are shown in U.S. Pat. Nos.: 3,572,159 to Tschanz; 4,117,691 to Fillmore; 5,161,428 to Petruccello; and 5,178,034 to Keasoner, all assigned to the assignee of the instant invention. An important attribute of such assemblies is that they include a spring which biases the telescoping members apart whereby the outward ends of the conduit are moved in the overall conduit shortening direction during installation just before the overall length of the conduit is fixed.

SUMMARY OF THE INVENTION AND ADVANTAGES

A motion-transmitting remote control assembly of the type for transmitting motion along a curved path by a flexible core element movably supported in first and second conduit sections and adjustment components interconnecting the first and second conduit sections for adjusting the overall length of the first and second conduit sections. The assembly is characterized by a spring interacting with the adjustment components to bias the components together to shorten the overall length of the first and second conduit sections.

In many installations situations it is desirable to increase the overall length of the conduit during the installation. This is accomplished by the subject invention wherein the telescoping members are biased into one another in the overall shortening direction instead of being biased apart as is prevalent in the prior art assemblies.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3*A* is a cross sectional view taken along line 3—3 of FIG. 1 *with first and second conduit sections being in a shortened position*;

*FIG. 3B is a cross sectional view similar to FIG. 3A with the first and second conduit sections being in an intermediate lengthened position;*

FIG. 6 is a side elevational view of the male member of the preferred embodiment; and FIG. 7 is a cross sectional view taken along line 7—7 of FIG. 3.

DETAILED DESCRIPTION OF THE PREFERRED EMBODIMENT

Figure 1:
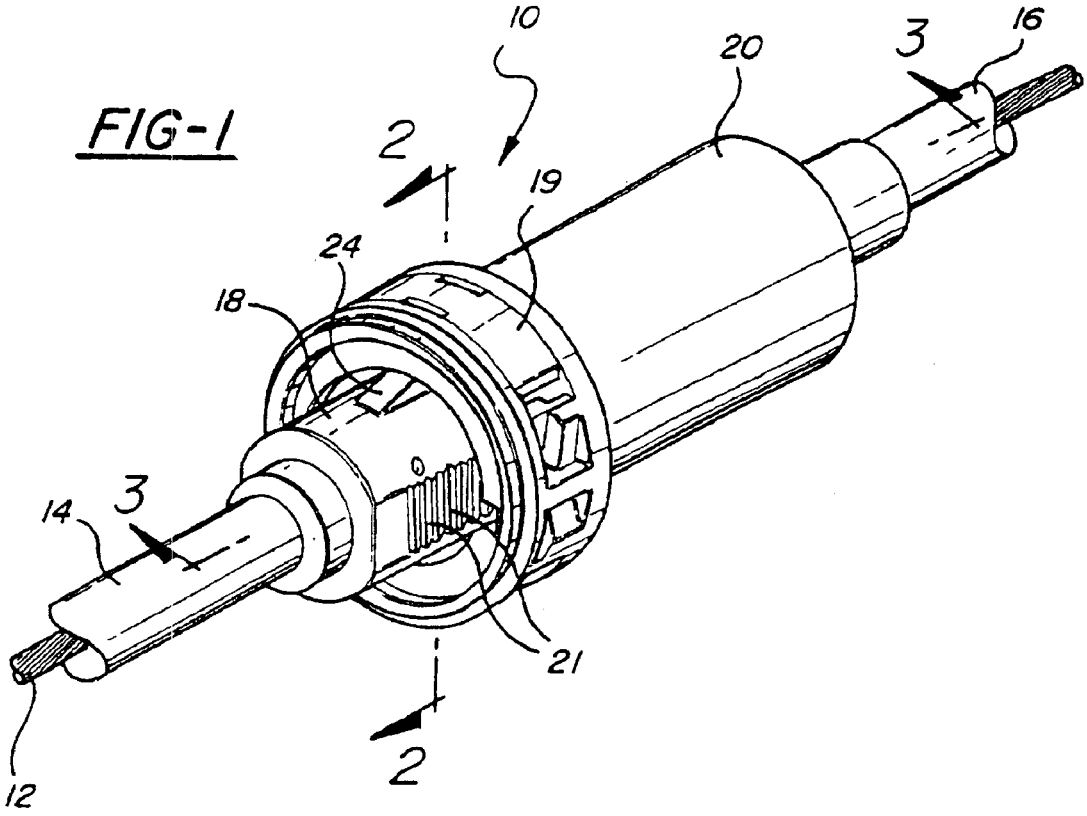
FIG. 1 is a perspective view of a preferred embodiment of the subject invention.

Referring to the Figures, wherein like numerals reference like or corresponding parts throughout the several views, a motion transmitting remote control assembly constructed in accordance with the subject invention is generally shown at 10. The motion transmitting remote control assembly 10 is of the type for transmitting motion in a curved path by a motion transmitting core element 12. The core element 12 is generally a wire or a plurality of stranded wires. The core element may also be divided into two parts along with the remainder of the assembly 10 and therefore include a connector for connecting the two core sections together, although such a connector is not shown many are well known in the art.

The assembly also includes first and second conduit sections. In the embodiment illustrated, the conduit sections include first 14 and second 16 conduits of the type well known in the art comprising an inner tubular member made of plastic and surrounded by wires or filaments helically disposed on a long lead angle with a plastic casing extruded about the long lay wires. The overall conduit includes the male fitting or first member 18 on the end of the first conduit section 14 and the female fitting or a second member 20 on the end of the second conduit section 16. The members 18 and 20 are made of plastic and molded about the respective ends of the conduit sections 18 and 20. It is to be understood that the subject invention may be implemented in assemblies which do not include the tubular flexible conduit sections, i.e., only the male and female members 18 and 20.

Figure 2:
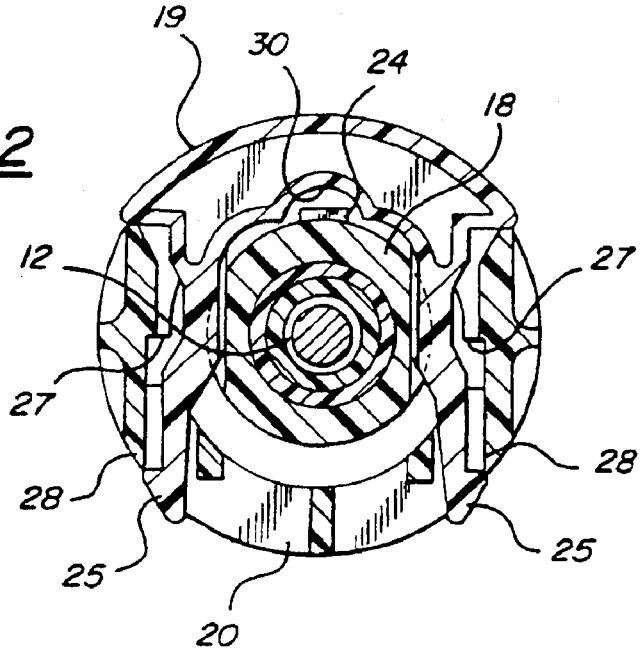
FIG. 2 is a cross sectional view taken substantially along line 2—2 of FIG. 1.
Figure 4:
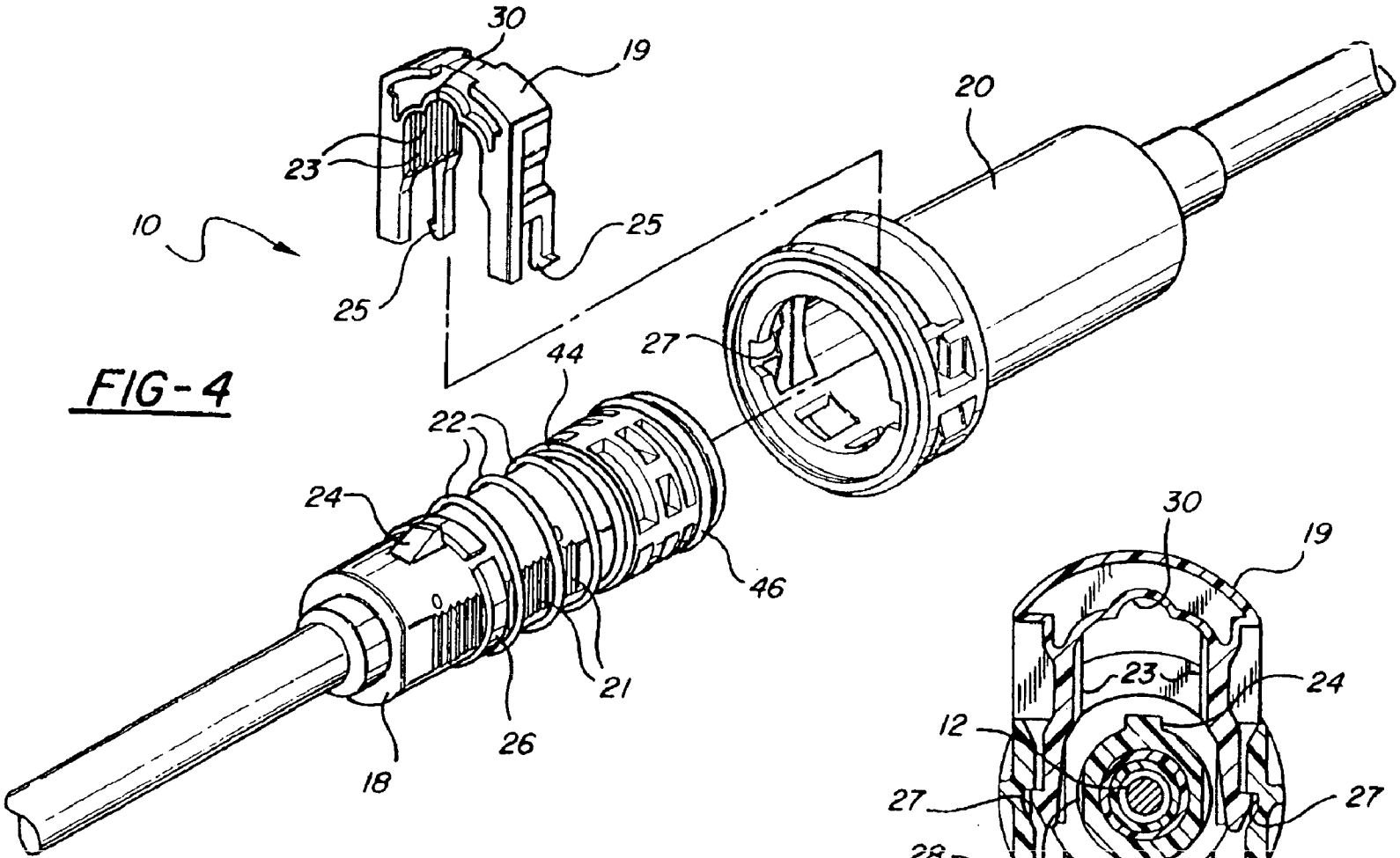
FIG. 4 is an exploded perspective view of the preferred embodiment.
Figure 5:
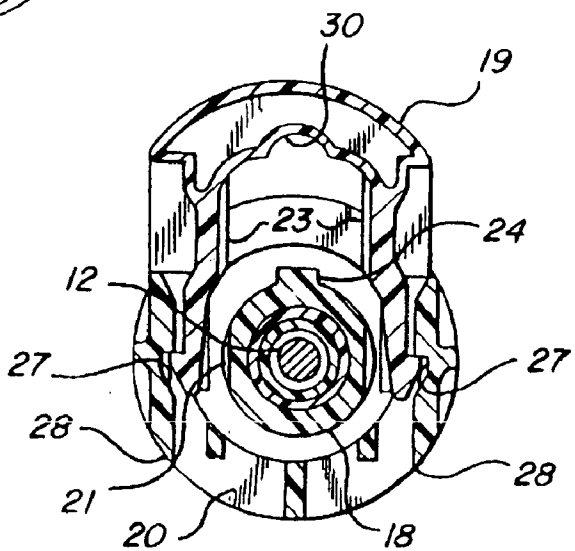
FIG. 5 is a cross sectional view similar to FIG. 2 but showing the assembly in the shipping position.

However, in the preferred embodiment the male and female members 18 and 20 define telescoping adjustment components interconnecting the first 14 and second 16 conduit sections for adjusting the overall length of the first and second conduit sections, i.e., the overall length of the conduit regardless of its makeup. The telescoping adjustment components include a locking member 19. The male member 14 includes adjustment teeth 21 therealong and the locking member 19 is supported by the female member 16 for engaging the teeth 21 in a locked position to prevent relative telescoping movement between the telescoping members 14 and 16. The locking member 19 is U-shaped with teeth 23 on the interior of the legs for engaging the teeth 21 on the male member 14. Hooks 25 are disposed at the distal ends of the legs and detent recesses 27 are disposed in the female member 16 for engaging the hooks 25 in an intermediate position out of engagement with the teeth 21. The female member 16 also presents catches 28 for engaging and retaining the hooks 25 to lock the locking member 19 in the locked position, as shown in FIG. 2. The locking member 19 includes a cap which engages the top of the female member 16 to limit the inward locking movement of the locking member 19.

This assembly 10 is characterized by a spring 22 interacting with the male and female adjustment components 18 and 20 to bias the components 18 and 20 together to shorten the overall length of the first and second conduit sections 14 and 16, a retainer 24 is disposed on one of the telescoping members during assembly thereof for retaining the spring 22 in compression: more specifically, the retainer is a projection on the male member 18. The spring 22 is a coil spring spiraled or helically disposed around the male member 18. An abutment is presented or defined by the locking member 19 for reacting with the end of the spring 22 in place of the retainer 24 upon assembly of the male 18 and female 20 telescoping members so that the telescoping members 18 and 20 are biased together in the direction to shorten the overall length of the conduit sections 14 and 16. An annular collar or ring 26 reacts axially between the retainer 24 and the end of the spring 22 during assembly and reacts between the spring 22 and the locking member 19 during adjustment of the overall length of the conduit sections 14 and 16. The collar 26 is split for radial expansion as it is forced over the retainer projection 24 during assembly of the spring and collar onto the male member 18. The collar is normally biased to closely engage the exterior of the male member 18.

The locking member 19 includes a tunnel 30 extending therethrough and the retainer projection 24 could be disposed on the opposite side of the member 18 in which case it would be movable through the tunnel 30 during telescoping movement of the male 18 and female 20 member in the conduit lengthening direction to allow the abutment on the locking member 19 to react with the collar and therefore the spring.

The male member 18 defines an inner end 32 and the female member 20 presents a bottom end wall 34. The inner end 32 of the male member 18 is adjacent the bottom end wall 34 when the male member 18 is fully inserted into the female member 20 to define the shortest overall length of the conduit sections 14 and 16. As the retainer 24 presents a reaction surface for reacting with the collar 26, the reaction surface is axially spaced toward the bottom end wall 34 from the abutment presented by the locking member 19 when the inner end 32 of the male member 18 is adjacent the bottom end wall 34 of the female member 20. This is accomplished by a pillar 36 extending into the female member 20 from the bottom end wall 34 thereof. The pillar 36 has a bore therethrough and the core element 12 extends through the bore in the pillar 36. The male 18 and female 20 members include complementary keyways 38 and 40 for rotary orientation of the male member 18 relative to the female member 20 to align the retainer projection 24 witin the locking member 19. The keyways 38 and 40 extend axially along the exterior of the pillar 36 and the interior of a bore into the end 32 of the male member 18. Furthermore, the male member 18 presents an internal limit surface 42 for engaging the inner conical end of the pillar 36 to limit the insertion of the male member 18 into the female member 20 to define the shortest overall length of the conduit.

Additionally, the male member 18 includes a sealing length adjacent the inner end 32 thereof in sliding engagement with the interior of the female member 20 and a reduced cross section defining a spring seat 44 therebetween. The spring 22 reacts between the spring seat 44 and the collar 26. An o-ring seal 46 seals the sealing length of the male member 18 and the interior of the female member 20.

Prior to shipment, the spring 22 is radially resilient enough to be forced over the retainer projection 24 and into engagement with the spring seat 44. The collar 26 follows the spring 22 and snaps over the retainer projection 24. The spring is in compression to react between the seat 44 and the collar 26 and is retained in this position as the male member 18 is inserted into the female member 20. The male member 18 is inserted into the female member 20 until the conical end of the pillar 36 abuts the tapered complementary surface 42 on the interior of the male member 18. In other words, the pillar 36 acts like a post to limit the contracting telescoping movement of the male 18 and female 20 members. Once inserted to this shortest overall conduit length, the collar 26 is disposed closer to the bottom end 34 of the female member than the edge of the pocket for receiving the locking member 19 so that the locking member 19 clears the collar 26 as the locking member 19 is inserted to the intermediate position with hooks 25 disposed in the detent recesses 27. In this intermediate position the teeth 23 on the locking member 19 are out of engagement with the teeth 21 on the male member 18 while in engagement with the collar. In other words, the retainer projection 24 may move through the tunnel 30 of the locking member 19 as the length of the conduit is increased whereas the sides of the locking member 19 will engage the collar 26 to compress the spring 22 thereby biasing the telescoping male 18 into the female 20 members together to shorten the overall conduit length. During the insertion of the male member 18 into the female member 20, the keyways 38 and 40 are aligned to align the male member 18 within the female member 20. Once the assembly is installed ands the overall length of the conduit is established, the locking member 19 is fully inserted to the locked position with its teeth 23 engaged with the teeth 21 on the male member 18.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

[1. A motion transmitting remote control assembly (10) type for transmitting motion in a curved path, said assembly coming:

first (14) and second (16) conduit sections;

a flexible motion transmitting core element (12) movably supported in said conduit sections;

adjustment components (18, 20) interconnecting said first and second conduit sections (14, 16) and in telescoping relationship with each other for adjusting the overall length of said first and second conduit sections;

a coil spring (22) interacting in tension between said adjustment components (18, 20) to bias said components together to shorten the overall length of said first and second conduit sections (14, 16).]

[2. An assembly as set forth in claim 1 including a retainer (24) for retaining said spring (22) in compression on one of said telescoping members.]

[3. An assembly as set forth in claim 2 wherein said adjustment components include an abutment (19) for reacting with said spring (22) in place of said retainer (24) to bias said telescoping members together in the direction to shorten the overall length of said conduit sections.]

4. [An assembly as set forth in claim 3] *A motion transmitting remote control assembly (10) for transmitting motion in a curved path, said assembly comprising:*

*a first (14) and second (16) conduit sections;*

*a flexible motion transmitting core element (12) movably supported in said conduit sections;*

*adjustment components (18, 20) interconnecting said first and second conduit sections (14, 16) and in telescoping relationship with each other for adjusting the overall length of said first and second conduit sections (14, 16)* wherein [said first telescoping member] *one of said adjustment components* is a female member (20) and [said second telescoping member] *the other of said adjustment components* is a male member (18) slidably disposed in said female member (20)*;*

[said spring (22) being] *a coil spring (22)* supported on said male member (18) *and interacting between said members (18, 20) to bias said members (18, 20) together to shorten the overall length of said first and second conduit sections (14, 16): and*

*a retainer (24) for retaining said spring (22) in compression on one of said members (18, 20), said members (18, 20) including an abutment (19) for reacting with said spring (22) in place of said retainer (24) to bias said members (18, 20) together in the direction to shorten the overall length of said conduit sections (14, 16).*

5. An assembly as set forth in claim 4 wherein said male member (18) includes adjustment teeth (21) therealong and a locking member (19) supported by said female member (20) for [engaging said teeth (21) in a locked position to prevent relative telescoping movement between] engaging said teeth (21) in a locked position to prevent relative telescoping movement between said telescoping members (18 and 20), said abutment being presented by said locking member (19).

6. An assembly as set forth in claim 5 wherein said locking member (19) includes a tunnel (30) extending therethough for receiving said retainer (24) through said tunnel (30) during telescoping movement of said male and female members (18 and 20) in the conduit lengthening direction to allow said abutment on said locking member (19) to react with said spring (22).

7. An assembly as set forth in claim 6 wherein said male and female member (18 and 20) include complementary keyways (38 and 40) for rotary orientation of said male member (18) relative to said female member (20).

8. An assembly as set forth in claim 7 wherein said spring (22) spiraled around said male member (18) and includes an annular collar (26) reacting axially between said retainer (24) and said spring (22) and for reacting between said spring (22) and said locking member (19).

9. An assembly as set forth in claim 8 wherein said male member (18) defines an inner end (32) and said female member (20) presents a bottom end wall (34), said retainer (24) presenting a reaction surface for reacting with said collar (26) and which reaction surface is axially spaced toward said bottom end wall (34) from said abutment presented by said locking member (19) when said inner end (32) of said male member (18) is fully inserted adjacent said bottom end wall (34) of said female collar (26).

10. An assembly as set forth in claim 9 including a detent (27) for holding said locking member (19) in an intermediate position out of engagement with said teeth (21) while in engagement with said collar (26).

11. An assembly as set forth in claim 10 wherein said male member (18) includes a sealing length adjacent said inner end (32) thereof in sliding engagement with said female member (20) and a reduced cross section defining a spring seat (44) therebetween, said spring (22) reacting between said spring seat (44) and said collar (26).

12. An assembly as set forth in claim 11 including a seal (46) sealing said sealing length of said male member (18) and said female member (20).

13. An assembly as set forth in claim 12 including a pillar (36) extending into said female member (20) from said bottom end wall (34) thereof, said pillar (36) having a bore therethrough, said core element extending through said bore in said pillar (36).

14. An assembly as set forth in claim 13 wherein said keyways (38 and 40) extend axially along the exterior of said pillar (36).

15. An assembly as set forth in claim 13 wherein said male member (18) presents an internal limit surface (42) for engaging the inner end (32) of said pillar (36) to limit the insertion of said male member (18) into said female member (20) to define the shortest overall length of said conduit.

16. An assembly as set forth in claim 13 wherein said locking member (19) is U-shaped with teeth (23) on the interior of said legs for engaging said teeth (21) on said male member (18) and hooks (25) at the distal ends of said legs, said detent (27) including recesses in said female member (20) for engaging said hooks (25) in said intermediate position, said female member (20) presenting catches (28) for engaging and retaining said hooks (25) to lock said locking member (19) in said locked position.

*17. The motion transmitting remote control assembly (10) of claim 4 wherein said spring (22) expands axially to bias the components (18, 20) together to shorten the overall length of said first and second conduit section (14, 16).*

*18. A motion transmitting remote control assembly (10) for transmitting motion in a curved path, said assembly comprising:*

*a first (14) and second (16) conduit sections;*

*a flexible motion transmitting core element (12) movably supported in said conduit sections;*

*adjustment components (18, 20) interconnecting said first and second conduit sections (14, 16) and in telescoping relationship with each other for adjusting the overall length of said first and second conduit sections (14, 16) wherein one of said adjustment components includes adjustment teeth (21) and the other of said adjustment components supports a locking member (19) that selectively engages said teeth (21) to prevent relative telescoping movement between said adjustment components (18, 20); and*

*a coil spring (22) interacting between said adjustment components (18, 20) to bias said components (18, 20) together to shorten the overall length of said first and second conduit sections (14, 16).*

*19. A motion transmitting remote control assembly (10) for transmitting motion in a curved path, said assembly comprising:*

*a first (14) and second (16) conduit sections;*

*a flexible motion transmitting core element (12) movably supported in said conduit sections;*

*adjustment components (18, 20) interconnecting said first and second conduit sections (14, 16) and in telescoping relationship with each other for adjusting the overall length of said first and second conduit sections (14, 16);*

*a coil spring (22) interacting between said adjustment components (18, 20) to bias said components together*

*to shorten the overall length of said first and second conduit sections (14, 16); and*

*a collar (26) supported on one of said adjustment components (18, 20) for reacting axially between said one of said adjustment components and said spring (22).*

*20. A motion transmitting remote control assembly (10) for transmitting motion in a curved path, said assembly comprising:*

*a first (14) and second (16) conduit sections;*

*a flexible motion transmitting core element (12) movably supported in said conduit sections;*

*adjustment components (18, 20) interconnecting said first and second conduit sections (14, 16) and in telescoping relationship with each other for adjusting the overall length of said first and second conduit sections (14, 16) wherein said adjustment components include a female member (20) and a male member (18) slidably disposed in said female member (20); and*

*a coil spring (22) supported on said male member (18) and interacting between said members (18, 20) to bias said members (18, 20) together to shorten the overall length of said first and second sections (14, 16).*

*21. An assembly as set forth in claim 20 including a retainer (24) disposed on one of said ajustment components (18, 20) for retaining said spring (22) in compression.*

*22. An assembly as set forth in claim 21 wherein said retainer (24) is formed as a projection on said male member (18).*

*23. An assembly as set forth in claim 20 including a locking member (19) supported by said female member (20) and movable between a locked position to prevent relative telescoping movement between the adjustment components (18, 20) and an unlocked position to allow relative telescoping movement between the adjustment components (18, 20).*

*24. An assembly as set forth in claim 23 wherein said male member (18) includes adjustment teeth (21) and said locking member (19) includes locking teeth (23) for selectively engaging said adjustment teeth (21) when said locking member (19) is moved to said locked position.*

*25. An assembly as set forth in claim 24 wherein said locking member (19) includes at least one detent (25) and said female member (20) includes at least one recess (27) for receiving said detent to hold said locking member (19) in said unlocked position while prohibiting relative movement between said female member (20) and said locking member (19).*

*26. An assembly as set forth in claim 25 wherein said female member (20) includes at least one catch (28) for engaging and retaining said detent (25) when said locking member (19) is moved to said locked position.*

*27. An assembly as set forth in claim 23 wherein said locking member (19) defines an abutment that reacts with said spring (22) during assembly of said male member (18) into said female member (20) such that said adjustment components (18, 20) are biased together to shorten the overall length of said conduit sections (14, 16).*

*28. An assembly as set forth in claim 20 wherein said male (18) and female (20) members includes complementary keyways (38, 40) for rotary orientation of the male member (18) relative to the female member (20).*

*29. An assembly as set forth in claim 28 including a retainer (24) formed on said male member (18) for retaining said spring (22) in compression and a locking member (19) supported on said female member (20), said locking member (19) being selectively engagable with said male member (18) to prevent relative movement between said male (18) and female (20) members wherein said keyways align said retainer (24) within said locking member (19) as said male member (18) is inserted into said female member (20).*

*30. A motion transmitting remote control assembly (10) for transmitting motion in a curved path, said assembly comprising:*

*a first (14) and second (16) conduit sections;*

*a flexible motion transmitting core element (12) movably supported in said conduit sections;*

*adjustment components (18, 20) interconnecting said first and second conduit sections (14, 16) and in telescoping relationship with each other for adjusting the overall length of said first and second conduit sections (14. 16);*

*a pillar (36) extending into said adjustment components (18. 20) and having a bore therethrough for receiving said core element (12); and*

*a coil spring (22) interacting between said components (18. 20) to bias said components (18. 20) together to shorten the overall length of said first and second conduit sections (14. 16).*

*31. An assembly as set forth in claim 30 wherein said adjustment components include a female member (20) and a male member (18) slidably disposed in said female member (20) including complementary keyways (38, 40) for rotary orientation of the male member (18) relative to the female member (20).*

*32. An assembly as set forth in claim 31 wherein said male member (18) presents an internal limit surface (42) for engaging an inner end (32) of said pillar (36) to limit insertion of said male member (18) into said female member (20) to define the shortest overall length of said conduit.*

*33. An assembly as set forth in claim 30 wherein said adjustment components include a female member (20) and a male member (18) slidably disposed in said female member (20), said pillar (36) being slidably disposed in said male member (18).*

* * * * *

UNITED STATES PATENT AND TRADEMARK OFFICE

CERTIFICATE OF CORRECTION

PATENT NO. : RE 39,327 E
APPLICATION NO. : 09/115764
DATED : October 10, 2006
INVENTOR(S) : Michael Reasoner It is certified that error appears in the above-identified patent and that said Letters Patent is hereby corrected as shown below:

Column 7

Line 22, after "second", insert --conduit--;

Line 24, replace "ajustment" with --adjustment--.

Signed and Sealed this

Twenty-sixth Day of December, 2006

JON W. DUDAS
*Director of the United States Patent and Trademark Office*